UNITED STATES PATENT OFFICE.

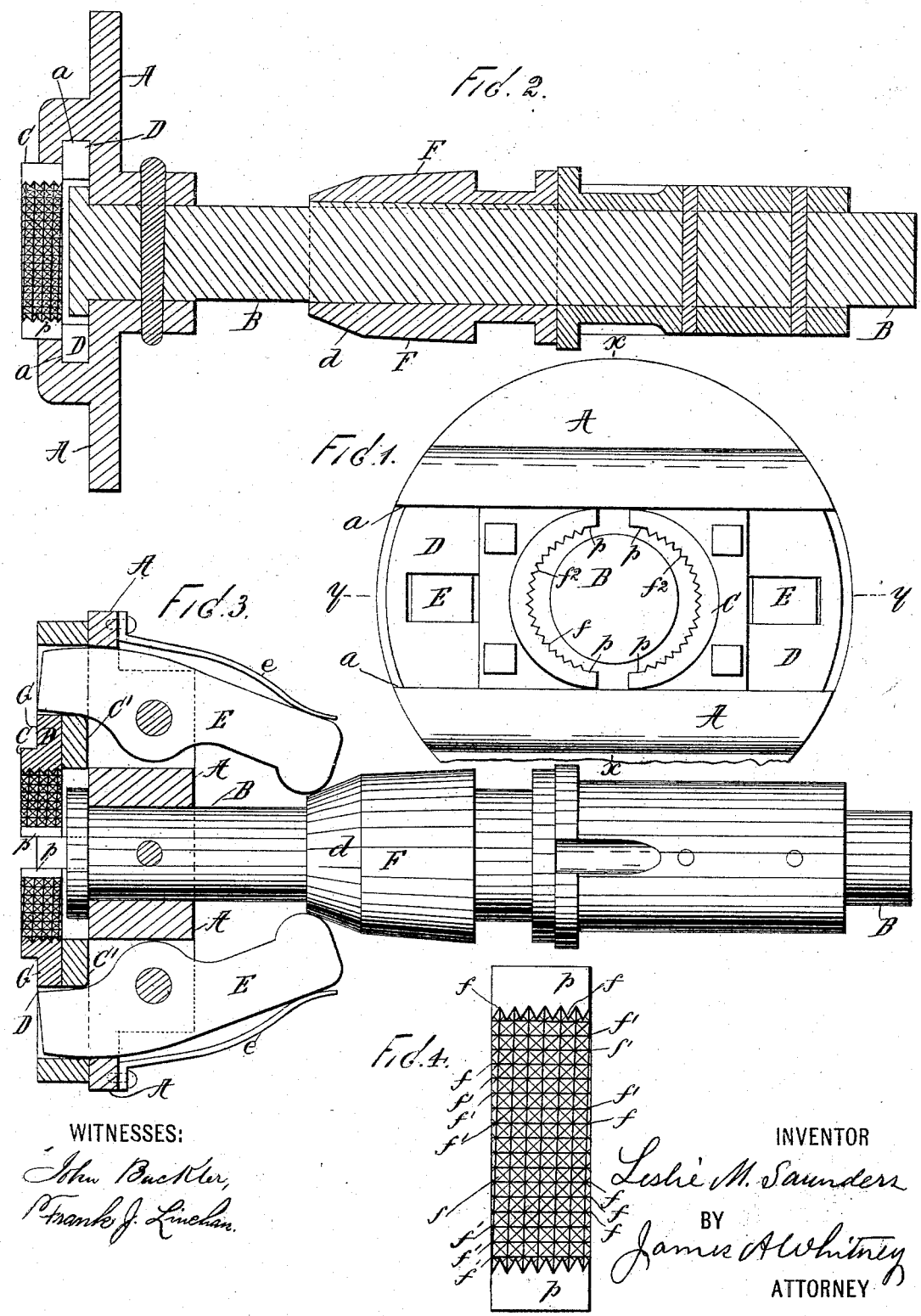

LESLIE M. SAUNDERS, OF YONKERS, NEW YORK, ASSIGNOR TO D. SAUNDERS' SONS, OF SAME PLACE.

NIPPLE-CHUCK.

SPECIFICATION forming part of Letters Patent No. 500,820, dated July 4, 1893.

Application filed December 2, 1892. Serial No. 453,810. (No model.)

*To all whom it may concern:*

Be it known that I, LESLIE M. SAUNDERS, of Yonkers, in the county of Westchester and State of New York, have invented certain new and useful Improvements in Nipple-Chucks; and I do hereby declare that the following is a full, clear, and exact description of the same, reference being had to the accompanying drawings, in which—

Figure 1 is a front or end view of an apparatus embracing my said invention. Fig. 2 is a longitudinal sectional view of the same taken in the line, $x$, $x$, of Fig. 1. Fig. 3 is a partial sectional view of the same the sectional portion taken in the line, $y$, $y$, of Fig. 1. Fig. 4 is a detail view on a larger scale showing the the gripping face of a jaw provided with, or constructed according to, my said invention.

This invention relates to that class of machinists' tools which are used for forming screw-threads upon metallic nipples, an operation which requires that an already threaded end of the nipple be gripped and held during the formation of a thread upon its opposite end. As heretofore constructed, implements of this class have comprised gripping jaws the inner or gripping faces of which are threaded to correspond to the thread upon the end to be gripped of the nipple; the screw threads of the one fitting between those of the other and by the friction of the intermeshing surfaces holding the nipple against the tendency, due to the thrust or action of the threading tool or dies, to turn within the jaws. It is found in practice that this merely frictional hold of the chuck upon the nipple is insufficient to accomplish its purpose, there being a tendency on the part of the nipple to screw inward into the chuck until it meets with some resistance to its longitudinal movement. This of course tends to disarrange the work. Further, as by far the greater number of nipples manufactured are made with right - hand threads it follows that a corresponding form and inclination must ordinarily be given to the gripping faces of the jaws, with the result that if it becomes necessary to form a left handed thread upon the nipple the reversed direction of the thrust upon the latter in forming such reversed thread, tends to screw the nipple out of the chuck with consequent damage and disarrangement of the work.

The object of my invention is to obviate these drawbacks to the convenient and effective use of nipple chucks and to this end it comprises certain novel combinations of parts whereby the threaded end of a nipple is firmly, safely and securely held against any turning movement within the chuck whether the thread be right or left handed, my said invention being applicable to nipple - chucks comprising in construction two or more jaws for gripping the nipple in whatsoever manner, or by whatsoever devices, said jaws are closed or opened to grasp or release the nipple.

In the apparatus as represented in the drawings A is the face-plate of a nipple chuck. Said face plate is fast upon the end of an arbor, B, which when the apparatus is in use is arranged in suitable bearings and provided with suitable means for its rotation and control. As the mounting and operation of nipple-chucks in general is well known in the art the mounting and some of the ordinary adjuncts of the apparatus are not shown in the drawings and for the same reason call for no special mention here. In the front of the face-plate, across the center thereof are provided opposite guides, or dove-tail grooves, $a$, in which are placed the sliding jaws, C. Said jaws except as hereinafter set forth may be of any suitable kind, character or construction so long as they are capable of being made to approach each other to grasp the nipple to be threaded between them with the axis of said nipple coincident with the axis of rotation of the face-plate. As shown in the drawings said jaws, C, are provided with outwardly projecting tongues, G, which lap upon rabbeted portions, C', of sliding blocks, D, the lateral edges of which together with the corresponding edges of the jaws, fit the guides to insure the requisite stability of the said parts as they are moved or operated in their guides. Pivoted at the back of the face-plate, one for each jaw, are levers, E, which extend through suitable openings in the face-plate with their outer arms stepped into recesses in the rear sides of the blocks, D, while their inner or rearwardly extended arms rest upon the conical end, $d$, of a sleeve, F, which is loose upon the shaft, B. The said inner ends of said levers are pressed against said conical end of said sleeve by springs, $e$. When the conical end of the sleeve is forced forward toward the face-plate it spreads the inner arms of the lever and consequently forces the jaws inward toward each other to grip a nipple duly placed between them. When a reverse movement is given to the sleeve the springs bring the rear arms of the levers toward each other in proportion as the receding of the conical end of the sleeve permits the springs to act. When desired three or any other desired number of jaws, C, each radial to the axis of motion of the face-plate, may be employed. Whatever the number of jaws, the inner end of each is recessed or hollowed out upon the arc of a circle which should be suitably proportioned to the diameter of that part of the nipple which is to be held by the chuck.

The parts thus far herein specifically described as shown in the drawings do not differ materially from what has heretofore been known and used and are here described simply as constituting a convenient and useful apparatus in which my invention may be advantageously applied to use; but, when desired my said invention may be used in any other suitable apparatus as, for example, one in which the jaws are operated as shown in the Letters Patent heretofore granted to Andrew Saunders on August 25, 1874, for an invention of an improved lever nipple chuck.

My invention concerns the gripping faces of the jaws, in whatsoever the latter may consist so long as they are consistent with the use and operation of my said invention, the latter relating to the gripping surfaces of the jaws.

In my said invention instead of providing simple screw threads to inter-mesh by a frictional contact with the threads on the nipple to be held, I provide in lieu of such thread upon the jaws, a spiral system of acute teeth, the inclination and pitch of the spiral line of teeth corresponding to the pitch and inclination of the thread upon the nipple to that extent that said teeth fit into the grooves between the threads on the nipple and, upon the jaws being made to grip the nipple, bite into the surfaces presented by said grooves, that is to say into the bottoms of the grooves and into the sides of the threads upon the nipple and thereby hold the latter against turning in either direction within or between the jaws. Said teeth may be very conveniently formed or provided to the jaws by first providing the latter with the ordinary screw-thread heretofore employed therein and then grooving, as shown at, $f'$, across said screw-threads in lines substantially parallel in direction with the axis of rotation of the face-plate, A. When the jaws are caused to approach each other and grip upon the nipple, the teeth, $f$, indent themselves into the metal of the nipple and thus differ essentially in their operation from that of the mere frictional hold of one screw-thread upon another as in the nipple chucks heretofore in use. As the teeth bite into or indent themselves in the metal of the nipple their hold upon the latter is positive in whichever direction the face-plate, and consequently, the nipple is rotated. From this it follows that the tendency to turn within or between the jaws which is incident to nipple chucks heretofore in use, and all the inconveniences resultant from such tendency is wholly obviated by my said invention.

It is of course to be understood that while my said invention is especially adapted to the holding of nipples as described, it may also be advantageously used for holding other articles having screw-threaded ends and which require to be chucked during threading, turning or like operations.

It will be observed by reference to the drawings, that the teeth do not extend upon the jaws to an extent that would bring them upon the entire circumference of the nipple where the same is gripped. This leaves a gripping portion, $p$, at the side of each jaw devoid of teeth but still of such proportions and configuration as to rest against the summit of the thread on the nipple. By these means the teeth may be readily withdrawn when the jaws are opened in opposite directions and, when the jaws are closed upon the threaded end of the nipple, the naked parts, $p$, hold against the sides of the gripped part of the nipple to prevent its bulging laterally in directions at right angles to those on which the pressure of the toothed surfaces of the jaws is exerted.

What I claim as my invention is—

1. The combination with the gripping jaws of a nipple-chuck of a series of biting or indenting teeth, $f$, arranged with a pitch and inclination corresponding to the pitch and inclination of the grooves between the screw-threads of the nipple to be held, substantially as and for the purpose herein set forth.

2. The combination with the gripping jaws of a nipple-chuck constructed with plain gripping portions, $p$, of a series of biting or indenting teeth, $f$, arranged between the portions, $p$, and having a pitch and inclination corresponding to the pitch and inclination of the grooves between the screw-threads of the nipple to be held, substantially as and for the purpose herein set forth.

LESLIE M. SAUNDERS.

Witnesses:
 JAMES S. FITCH,
 OSCAR BORDEN WARING.